United States Patent
Campinos et al.

[11] Patent Number: 6,035,397
[45] Date of Patent: Mar. 7, 2000

[54] PROCESS FOR DATA CERTIFICATION BY SCRAMBLING AND CERTIFICATION SYSTEM USING SUCH A PROCESS

[75] Inventors: Arnaldo Campinos, Rennes; Louis Gregoire, Cassis; Jean-Marie Vigneron, Fontainebleau, all of France

[73] Assignee: Thomson Multimedia, S.A., Boulogne Cedex, France

[21] Appl. No.: 08/971,016

[22] Filed: Nov. 14, 1997

[30] Foreign Application Priority Data

Nov. 14, 1996 [FR] France ................................. 96 13889

[51] Int. Cl.$^7$ .................................................. H04K 1/00
[52] U.S. Cl. .............................................. 713/39; 713/200
[58] Field of Search ................................ 380/25; 235/380

[56] References Cited

U.S. PATENT DOCUMENTS

| | | | |
|---|---|---|---|
| 5,191,611 | 3/1993 | Lang ........................................... | 380/25 |
| 5,282,149 | 1/1994 | Cohen et al. . | |
| 5,703,951 | 12/1997 | Dolphin ....................................... | 380/25 |
| 5,721,781 | 2/1998 | Deo ............................................ | 380/25 |
| 5,870,476 | 2/1999 | Fischer ....................................... | 380/24 |

FOREIGN PATENT DOCUMENTS

| | | |
|---|---|---|
| 0 461 029 | 12/1991 | European Pat. Off. . |
| 0 618 736 | 10/1994 | European Pat. Off. . |
| 0679 029 | 10/1995 | European Pat. Off. . |
| 0 719 045 A2 | 6/1996 | European Pat. Off. . |
| 0723 371 A1 | 7/1996 | European Pat. Off. . |

OTHER PUBLICATIONS

IEEE Micro, vol. 12, No. 6, Dec. 1, 1993 pp. 74–81, Kaliski B: "A Survey of Encryption Standards".

IEEE Communications Magazine, vol. 28, No. 5, May 1, 1990, pp. 21–29, XP000132493 Omura J.K.: "Novel Applications of Cryptography in Digital Communications".

Proceedings of the National Electronics Conference, vol. 35, 1981 Oct.. Oak Brook, Illinois US, pp. 296–301 Authentication using the Federal Data Encryption Standard:.

*Primary Examiner*—Todd R. Swann
*Assistant Examiner*—Todd Jack
*Attorney, Agent, or Firm*—Joseph S. Tripoli; Peter M. Emanuel; David T. Shoneman

[57] ABSTRACT

The invention relates to a process for data certification as well as to the system implementing the certification process.

The certification of the data is performed by scrambling.

An authority independent of the entity which controls the data source and of the user(s) for which these data are intended, scrambles the data with the aid of control words and encrypts the control words with the aid of an encryption algorithm with key K.

So that a user or the users can descramble the data scrambled by the independent authority, a certification verification device containing the encryption key K is supplied to the user or users under the control of the independent authority.

The certification process and the system associated therewith apply more particularly to conditional-access systems.

27 Claims, 8 Drawing Sheets

PROCESS FOR DATA CERTIFICATION BY SCRAMBLING AND CERTIFICATION SYSTEM USING SUCH A PROCESS

BACKGROUND OF THE INVENTION

The invention relates to a process for data certification as well as to a system implementing such a process.

The invention applies more particularly to the certification of data containing a large amount of information such as, for example, video data with a bit rate of the order of 4 to 5 Mbits/s.

According to the prior art, the certification of video data is performed by signing: the video signal is hashed with the aid of a hash algorithm and each block arising from the hash algorithm is signed with the aid of a key.

Such a certification process has the drawback of being time-consuming. The central unit of the system which processes the information, this central unit commonly being denoted CPU ("Central Processing Unit"), must in fact make considerable processing capacity available to the certification operation.

SUMMARY OF THE INVENTION

The invention does not have this drawback.

The invention relates to a process for certifying by scrambling data intended to be transmitted from a data source to at least one receiving device, as well as a system making it possible to implement such a process.

According to the invention, an authority independent of the entity which controls the data source and of the user for which these data are intended, scrambles the data with the aid of control words and encrypts the control words with the aid of an encryption algorithm with key KA. So that a user or the users can descramble the data scrambled by the independent authority, a certification verification device containing the encryption key KA is supplied to the user or users under the control of the independent authority.

The phrase independence of the authority in relation to the entity which controls the source and to the user(s) for whom the data are intended, should be understood to mean that the scrambling of the data as well as the encryption of the control words which are performed by the independent authority are known neither to the entity which controls the source nor to the user of the data.

Similarly, saying that the certification verification device is supplied to the user(s) under control of the independent authority implies that the certification verification device contains information which is known only to the independent authority alone and which makes it possible to retrieve an unenciphered item from the scrambled item which it receives.

Thus, the invention relates to a process for certifying data which arise from a source forming part of a first entity and are intended for at least one user. The process comprises:

- a step of scrambling the data ECG1 arising from the source with the aid of a first string of control words CW1, so as to construct a first scrambled item IE(ECG1),
- a step of encryption of the first string of control words CW1 with the aid of an encryption algorithm with key KA, so as to construct a first string of encrypted control words E(CW1)$_{KA}$,
  the said scrambling and encryption steps being performed by an authority independent of the first entity and also of the user,
- a step of transfer, to the user, of the first scrambled item IE(ECG1) and of the first string of encrypted control words E(CW1)$_{KA}$, and
- a step of decryption of the encrypted control words E(CW1)$_{KA}$, and of descrambling of the scrambled data IE(ECG1) with the aid of means supplied to the user under the control of the independent authority.

By way of examples, the step of scrambling the data ECG1 can be performed by a scrambling algorithm under the DES standard ("Data Encryption Standard") or else the DVB Super-Scrambler standard ("Digital Video Broadcasting Super-Scrambler").

The invention also relates to a system for certifying data which arise from a source and are intended for at least one user, the source forming part of a first entity. The certification system comprises:

- a scrambling and encryption device forming part of an authority independent of the first entity and making it possible to scramble the data arising from the source with a first string of control words CW1 so as to construct a first scrambled item IE(ECG1) and to encrypt the first string of control words CW1 with an encryption algorithm with key KA so as to construct the encrypted control words E(CW1)$_{KA}$, and
- a certification verification device supplied to the user under the control of the independent authority and comprising circuits making it possible to decrypt the encrypted control words E(CW1)$_{KA}$ and to descramble the first scrambled item IE(ECG1) with the aid of the decrypted control words CW1.

Advantageously, only the data having been scrambled under the control of the independent authority can be descrambled by the user(s) furnished with the certification verification device.

According to the invention, the certification of the data can be performed directly or indirectly by the independent authority.

In the case of direct certification, the scrambling and encryption circuit forms part of the structure constituted by the independent authority itself.

In the case of indirect certification, the scrambling and encryption circuit is delegated, by the independent authority, to an entity distinct from the independent authority. This entity distinct from the independent authority can be the entity which controls the source or an entity different from the entity which controls the source.

According to an advantageous enhancement of the preferred embodiment of the invention, outside of the scrambling and encryption device forming part of the independent authority, the unencrypted control words are not accessible at any point of the certification system. In the case of indirect certification, the delegated scrambling and encryption device is then embodied as a circuit, for example a chip card, (or smart card) which does not allow unenciphered access to the control words which it generates within itself.

As mentioned previously, an advantage of the invention consists in reducing to a considerable degree the processing time relating to the data certification operation, thus allowing the certification of a large amount of information.

Other characteristics and advantages of the invention will emerge from reading a preferred embodiment given with reference to the appended figures in which:

BRIEF DESCRIPTION OF THE DRAWINGS

In all the figures, the same labels denote the same elements.

DESCRIPTION OF THE PREFERRED EMBODIMENTS

Figure 1:
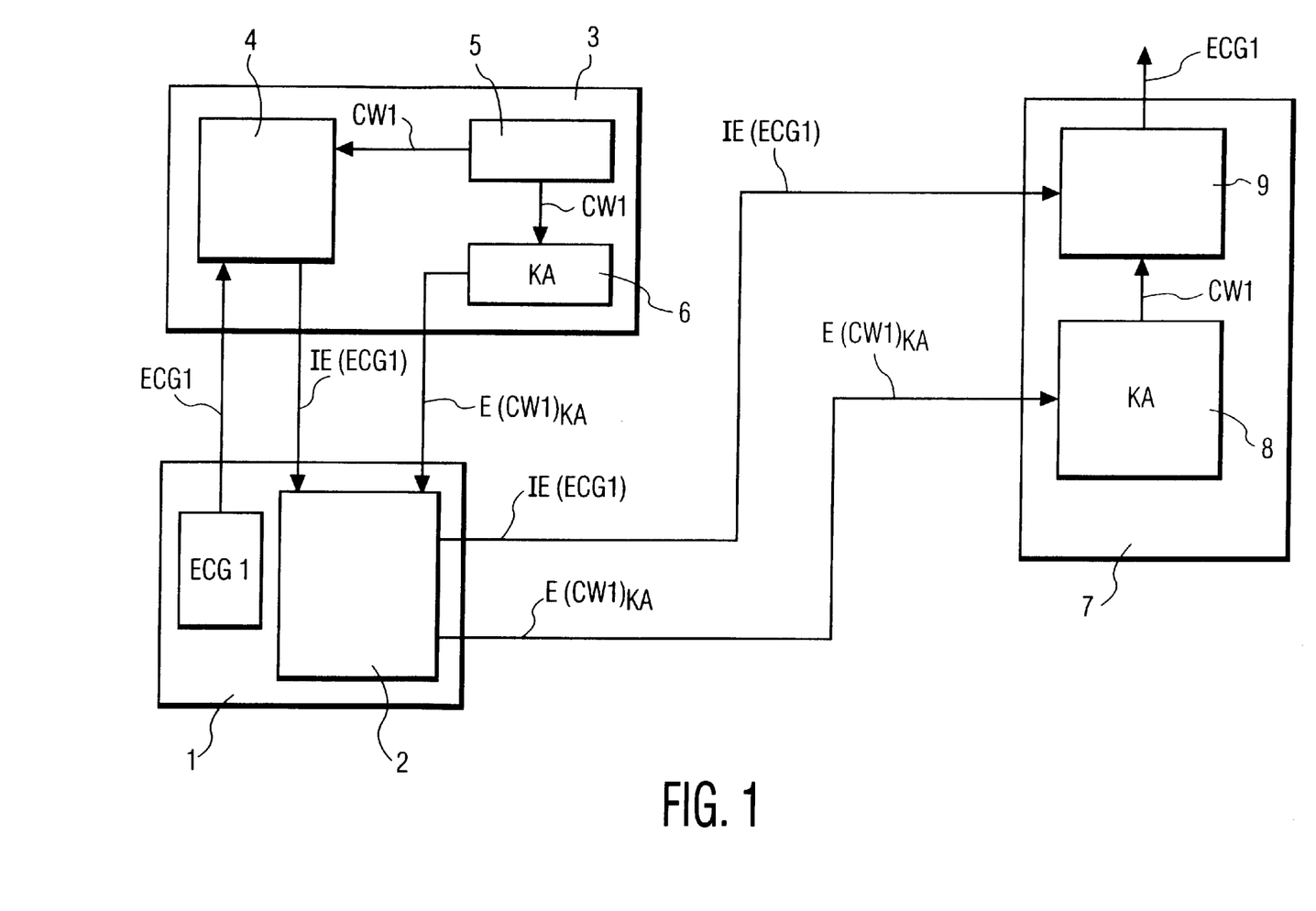
FIG. 1 represents the schematic of a first system for certification by scrambling according to the invention.

FIG. 1 represents the schematic of a first system for certification by scrambling according to the invention.

The system of FIG. 1 comprises an information source 1, a scrambling and encryption device 3 and a certification verification device 7.

The scrambling and encryption device 3 forms part of the structure constituted by the previously mentioned independent authority and the certification verification device 7 is a device supplied to the user(s) under control of the independent authority.

According to the invention, the item ECG1 contained in the source 1 is an unenciphered item which is sent to a scrambling device 4 contained in the scrambling and encryption device 3.

In the case of video data, the unenciphered item ECG1 is delivered, for example, in the form of a data stream under the MPEG2 standard.

The scrambling and encryption device 3 also comprises a generator 5 of control words CW1 as well as a device 6 for encrypting the control words with the aid of an algorithm with key KA.

The control words CW1 are applied, on the one hand, to the scrambling device 4 so that the latter generates the scrambled item IE(ECG1) and, on the other hand, to the encryption device 6 so that the latter generates the control words encrypted with the encryption algorithm with key KA, $E(CW1)_{KA}$.

The scrambled item IE (ECG1) and the encrypted control words $E(CW1)_{KA}$ arising from the scrambling and encryption device 3 are stored in a data base 2 which forms part of the entity which contains the source 1.

The data base 2 is linked to the certification verification device 7 in such a way that the scrambled item IE(ECG1) and the encrypted control words $E(CW1)_{KA}$ can be transmitted to the device 7. The device 7 is a descrambling device consisting, for example, of a chip card 8 containing the key KA for encrypting the control words and of a decoder 9.

The chip card 8 receives the encrypted control words $E(CW1)_{KA}$, decrypts them and transmits them to the decoder 9.

The scrambled item IE(ECG1) is transmitted to the decoder 9. Under the action of the control words CW1 arising from the chip card 8, the decoder 9 generates the descrambled item ECG1.

According to the invention, the independent authority which controls the scrambling and encryption device 3 and the certification verification device 7 is a compulsory pass of the data to be transmitted.

Advantageously, apart from actually carrying out the certification of the data which travel through it, the independent authority can thus guarantee the authorship and/or integrity of the data. The phrase integrity of the data should be understood to mean that the unenciphered data which are retrieved by the receiving circuit are indeed those which were output by the source.

Figure 2:
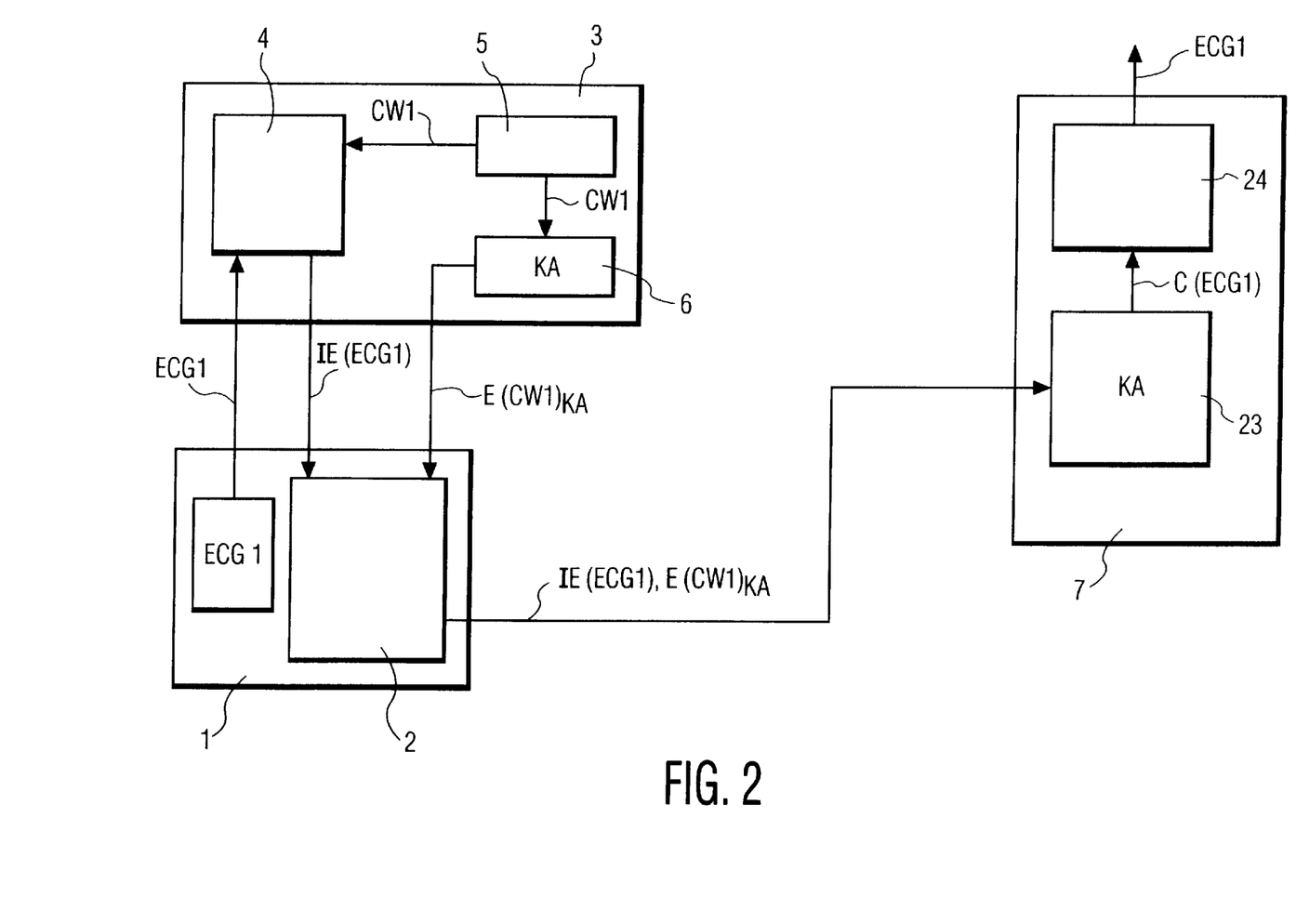
FIG. 2 represents the schematic of the first system for certification by scrambling according to the previously mentioned enhancement of the invention.

FIG. 2 represents the schematic of the first system for certification by scrambling according to the enhancement of the invention.

The scrambling and encryption device 3 as well as the source 1 are identical to those described in FIG. 1.

The certification verification device 7 of FIG. 2 contains elements which are, wholly or partly, different from those contained in the device 7 of FIG. 1.

According to the enhancement of the invention, represented in FIG. 2, the user-card 23 makes it possible not only to decrypt the control words with the aid of the key KA which it contains, but also to descramble the scrambled item IE(ECG1). By way of examples, the chip card can be a card complying with the American standard "National Renewable Security Standard", DIS679, published by the "Electronic Industry Association" association or else a chip card of the PCMCIA type complying with the interface standard known to those skilled in the art as the "DVB-Common Interface".

The user-card receives a data stream consisting of the scrambled item IE(ECG1) and of the encrypted control words $E(CW1)_{KA}$. The item C(ECG1) arising from the card 23 is a descrambled item which is coded, for example, in the form of an MPEG data stream. The decoder 24 receives the item C(ECG1) so as to decode it.

Advantageously, as mentioned previously, the unenciphered control words CW1 are not accessible at user level and, consequently, nowhere other than in the device 3 which belongs to the independent authority.

Figure 3:
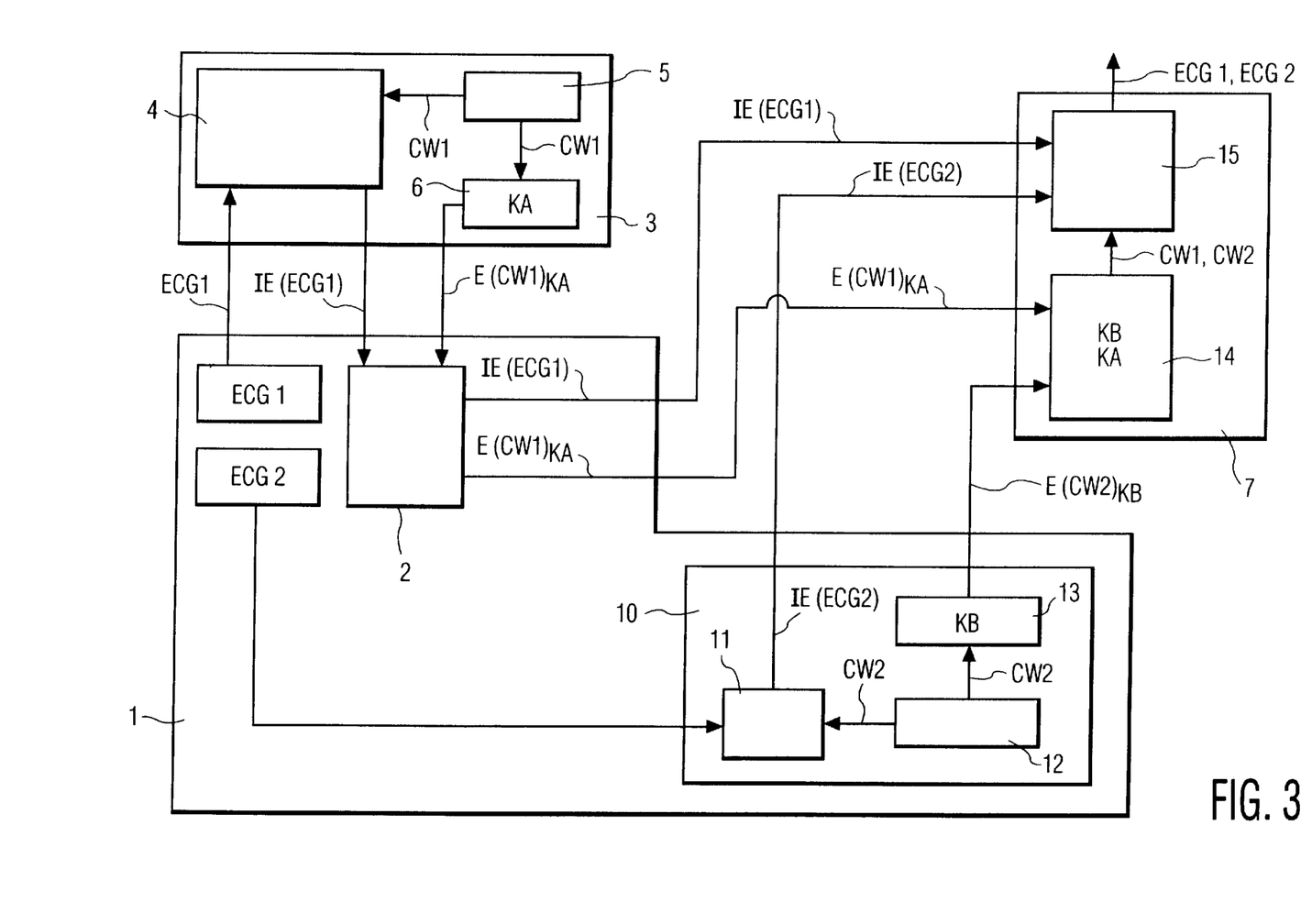
FIG. 3 represents the schematic of a second system for certification by scrambling according to the invention.

FIG. 3 represents the schematic of a second system for certification by scrambling according to the invention.

The system described in FIG. 3 is composed of the same structures as that described in FIGS. 1 and 2: an information source 1, a scrambling and encryption device 3 and a certification verification device 7.

According to the second system for certification by scrambling, a first part of the unenciphered data ECG1 travels through a circuit identical to that described in FIG. 1 and a second part of the unenciphered data ECG2 travels through a circuit different from that described in FIG. 1.

The circuit through which the data ECG2 travel comprises a device 10 for scrambling and encryption by delegation. According to the example represented in FIG. 3, the device 10 forms part of the entity which contains the source 1. According to other embodiments, the circuit 10 can belong to a different entity from that which contains the source 1.

The circuit 10 consists of a generator 12 of control words CW2, of a device 13 for encrypting the control words with encryption key KB and of a scrambling device 11.

The control words CW2 are applied, on the one hand, to the scrambling device 11 and, on the other hand, to the encryption device 13 so that the latter generates the control words CW2 encrypted with an encryption algorithm with key KB, $E(CW2)_{KB}$.

The control words CW2 serve to scramble the item ECG2. The scrambled item IE(ECG2) as well as the encrypted control words $E(CW2)_{KB}$ arising from the circuit 10 are sent from the source 1 to the certification device 7.

The certification verification device 7 is a descrambling circuit consisting, for example, of a chip card 14 and of a decoder 15. The encrypted control words $E(CW2)_{KB}$ are applied to the card 14 which contains not only the encryption key KA but also the encryption key KB. It follows that the control words CW2 and CW1 are generated by the card 14. The decoder 15 which receives on its input the scrambled data IE(ECG1) and/or IE(ECG2) can then descramble them and generate the unenciphered items ECG1 and/or ECG2.

According to the embodiment of the invention as represented in FIG. 2, the certification circuit 10 is delegated to the entity which controls the source by the previously mentioned independent authority.

The advantage of such a system for certification by delegation is to make it possible to hierarchize the information items to be certified. This hierarchization of the data to be certified will be clearly apparent in the example applications described in FIGS. 7 and 8.

Figure 4:
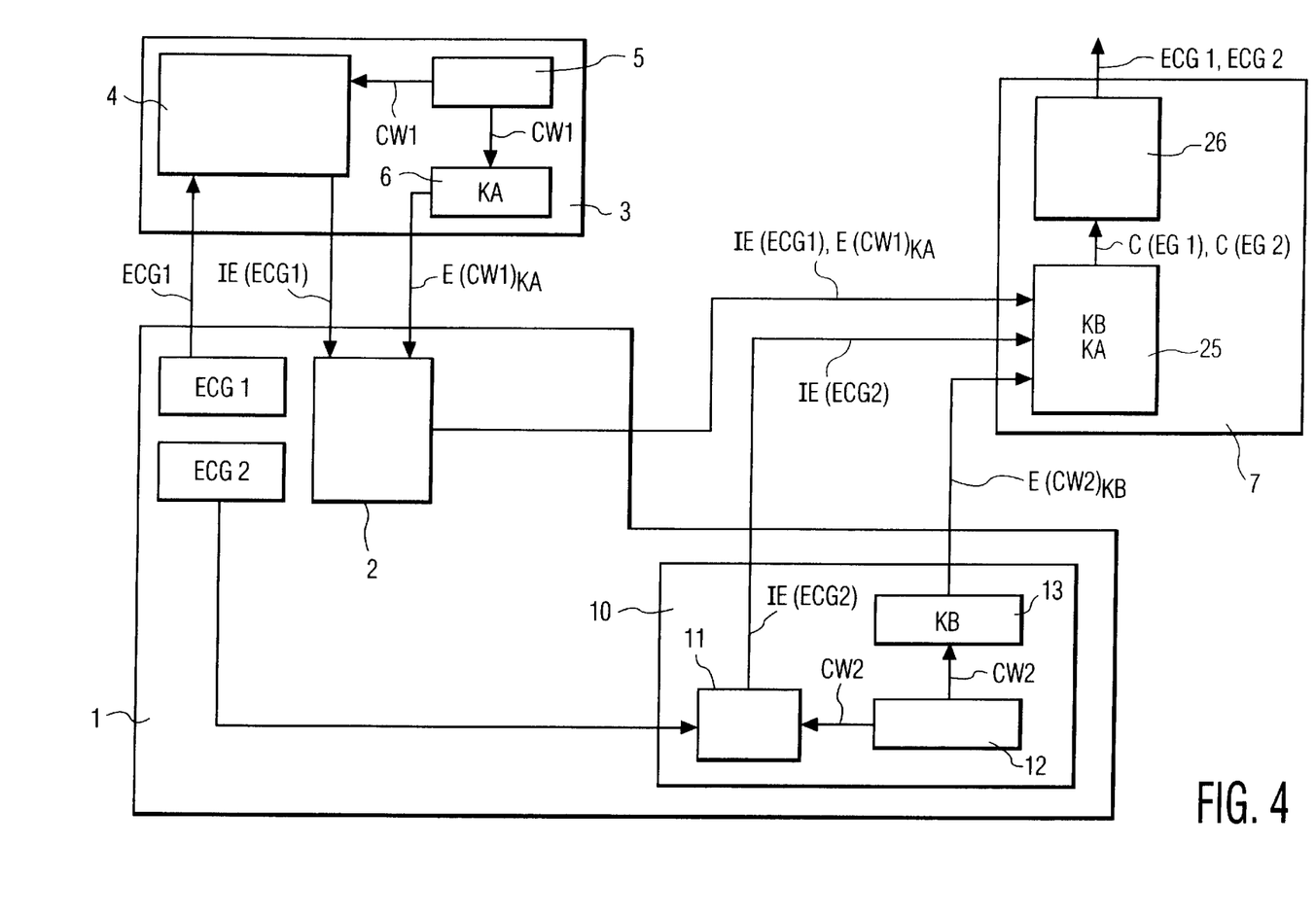
FIG. 4 represents the schematic of the second system for certification by scrambling according to the previously mentioned enhancement of the invention.

FIG. 4 represents the schematic of the second system for certification by scrambling according to the enhancement of the invention.

The scrambling and encryption device 3 as well as the source 1 are identical to those described in FIG. 3.

According to the enhancement of the invention, the user-card 25 receives the set of data IE(ECG1), $E(CW1)_{KA}$, IE(ECG2), $E(CW2)_{KB}$. The user-card decrypts the encrypted control words with the aid of the keys KA and KB which it contains and descrambles the scrambled with the aid of the decrypted control words.

The item arising from the card 25 then consists of the descrambled and coded items C(ECG1) and C(ECG2). As in the case of the embodiment described in FIG. 2, the coded items, for example in the form of an MPEG data stream, are decoded by the decoder 26 which thus makes it possible to generate the unenciphered items ECG1 and ECG2.

FIGS. 5, 6, 7 and 8 represent example applications of the certification system according to the invention to a conditional-access system.

As is known to those skilled in the art, a conditional-access system enables a service provider to supply his services only to those users alone who have acquired entitlements with regard to these services. Such is the case, for example, in pay-television systems.

As is known to those skilled in the art, the service supplied by a service provider consists of an item scrambled by control words. The scrambled item can only be descrambled, and hence read by the user, in line with the entitlements allocated to this user.

So as to descramble the item, the service provider supplies each user with the control words which served to scramble the item. In order to keep the control words secret, they are supplied after having been encrypted with an algorithm with key KSP, the key KSP being a key individual to the service provider.

The various encrypted control words are sent to the various users in messages which will be denoted ECM hereafter.

So as to grant access to his service only to authorized users alone, the service provider supplies each of the users with a chip card and a decoder. The set consisting of the chip card and the decoder makes it possible to descramble the scrambled item.

The chip card makes it possible, on the one hand, to validate and record the entitlements which the user has with regard to the service delivered and, on the other hand, to decrypt, with the aid of the key KSP, the encrypted control words. For this purpose, the chip card contains the key KSP of the algorithm which made the encryption of the control words possible.

The entitlements of each user are sent in messages which will be denoted EMM hereafter.

According to the known art, an EMM dedicated to a user contains three main items:

a first item giving the address of the user's card;

a second item giving the description of the user's entitlements;

a third item making it possible to validate the EMM and to verify that the user's entitlements contained in the EMM are indeed the entitlements reserved for the user.

As mentioned previously, the encrypted control words are sent to the users via the ECMs.

According to the known art, an ECM consists of a header and a body:

The header gives, among other things, the type and size of the items contained in the body of the ECM; the body consists, among other things, of an item containing the set of conditions of access to the service supplied by the provider, of an item containing a control word encrypted with the algorithm with key KSP and of an item containing a datum dependent on the key KSP and which makes it possible to validate and verify the contents of the ECM and, more particularly, of the access conditions contained in the ECM.

When the decoder of a user recognizes the address of the card associated therewith from among the various addresses distributed by the service provider, the EMM corresponding to the recognized address is analysed by the card. The analysis of the EMM is commonly performed with the aid of an analysis algorithm which depends on the key KSP for encrypting the control words.

Conditional-access systems are mainly of two types.

A first system is commonly referred to as an on-line system. In an on-line conditional-access system the scrambled item is an item consisting of a signal distributed simultaneously to the various customers of a service provider from a single source. This distribution can be performed, for example, over the airways or else by cable. As is known to those skilled in the art, in such a conditional-access system, the ECMs are sent by the service provider together with the scrambled item.

A second conditional-access system is commonly referred to as a stand-alone system. In a stand-alone conditional-access system the scrambled item and the ECMs are contained on stand-alone information media such as, for example, compact discs or digital video discs.

Within the framework of the application of the invention to a conditional-access system, the encrypted control words are supplied by the service provider to his customers after having been scrambled by an authority independent of the service provider.

Thus, the invention relates to a conditional-access system comprising at least one source of information items which are to be scrambled before being distributed to at least one customer by way of a service provider. The system comprises a device making it possible to scramble the said information items with a first string of control words, a device for encrypting the first string of control words with an encryption algorithm with key KA and an encryption device making it possible to encrypt the control words thus encrypted with an algorithm with key KSP, the key KSP depending on the service provider and the key KA depending on an authority independent of the service provider.

Figure 5:
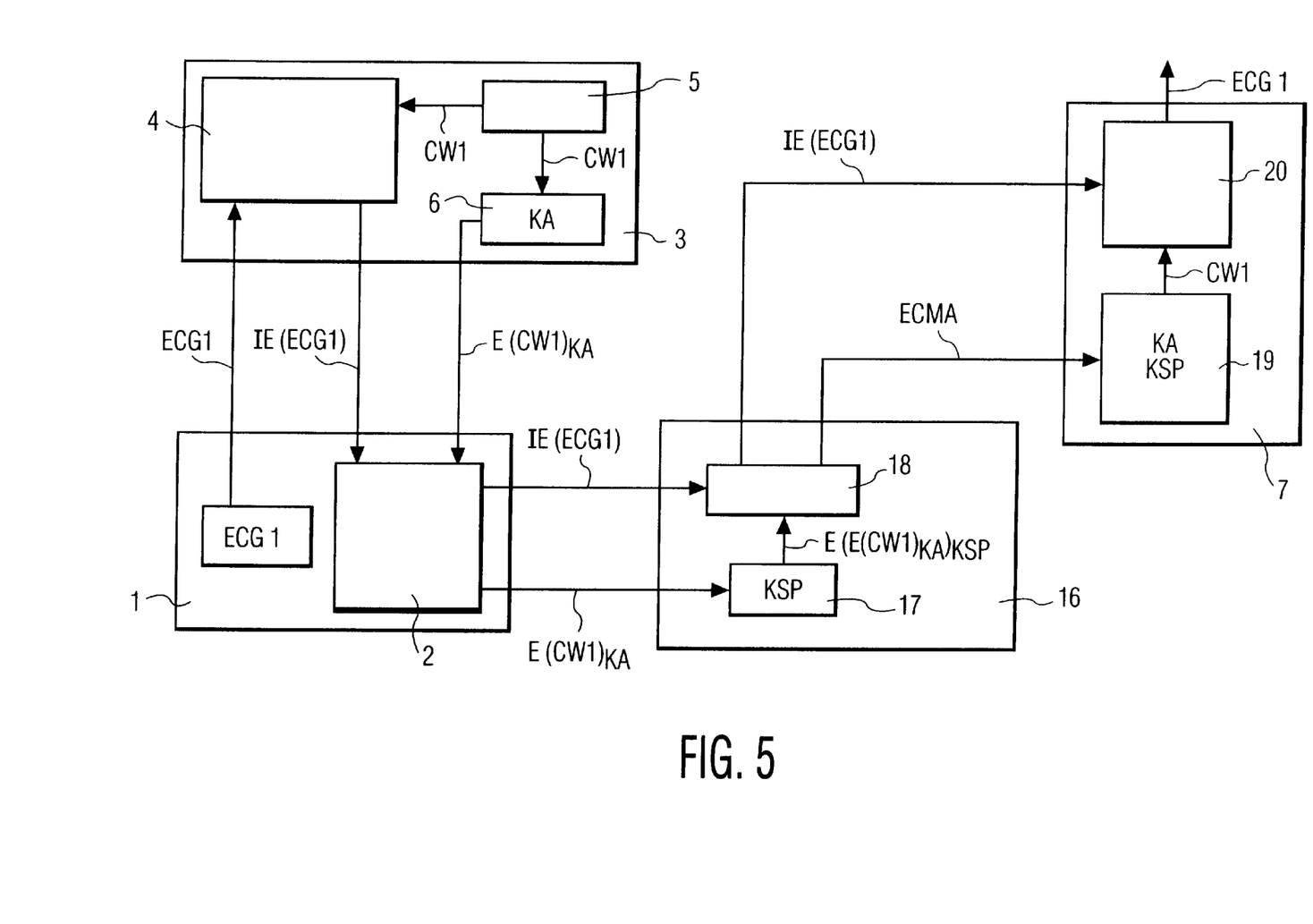
FIG. 5 represents a first application of the certification system according to the invention.

FIG. 5 represents a first example application, to a conditional-access system, of the certification system according to the invention.

This system is composed of a source 1 of unenciphered data, of a distribution circuit 16, of a scrambling and encryption device 3 and of a certification verification device 7.

The source 1 of unenciphered data ECG1 forms part of the entity constituted by a data supplier. The distribution circuit 16 belongs to the service provider whose function is to distribute the data which it receives from the data supplier. The scrambling and encryption device 3 forms part of the structure constituted by the independent authority. The device 7 is supplied to the various customers of the service provider under the control of the independent authority.

The phrase independent authority should be understood here to mean an entity independent of the data supplier, of the service provider and also of the customers of the service provider.

As before, the unenciphered item ECG1 is sent to the scrambling device 4 contained in the device 3 and the scrambled item IE(ECG1) is stored in the data base 2. The control words CW1 which made the scrambling of the unenciphered item possible are encrypted with an encryption algorithm with key KA and the encrypted control words $E(CW1)_{KA}$ are stored in the data base 2.

The distribution circuit 16 of the service provider comprises an encryption circuit 17 and a data base 18.

The scrambled item IE(ECG1) is sent to the data base 18 and the encrypted control words $E(CW1)_{KA}$ are sent to the encryption device 17. The encryption device 17 is an encryption device with encryption key KSP, the key KSP being a key specific to the service provider and preferably different from the key KA.

The data sent by the service provider to the customer then consist of the scrambled item IE(ECG1) and of the item $E(E(CW1)_{KA})_{KSP}$ which arises from the encrypting of the data $E(CW1)_{KA}$.

The certification verification device 7 comprises a user-card 19 and a decoder 20.

The item $E(E(CW1)_{KA})_{KSP}$ is sent by way of ECMs, denoted ECMA in FIG. 3, to the user-card 19, which contains the encryption keys KA and KSP.

The user card 19 decrypts the item which it receives and thus makes it possible to generate the control words CW1 which, applied to the decoder 20, allow the descrambling of the item IE(ECG1).

The user card contains the two encryption keys KA and KSP. According to the preferred embodiment of the invention, the user card is issued by the independent authority so that the key KA is kept secret from the or the various service providers and the or the various data suppliers working under its control.

Figure 6:
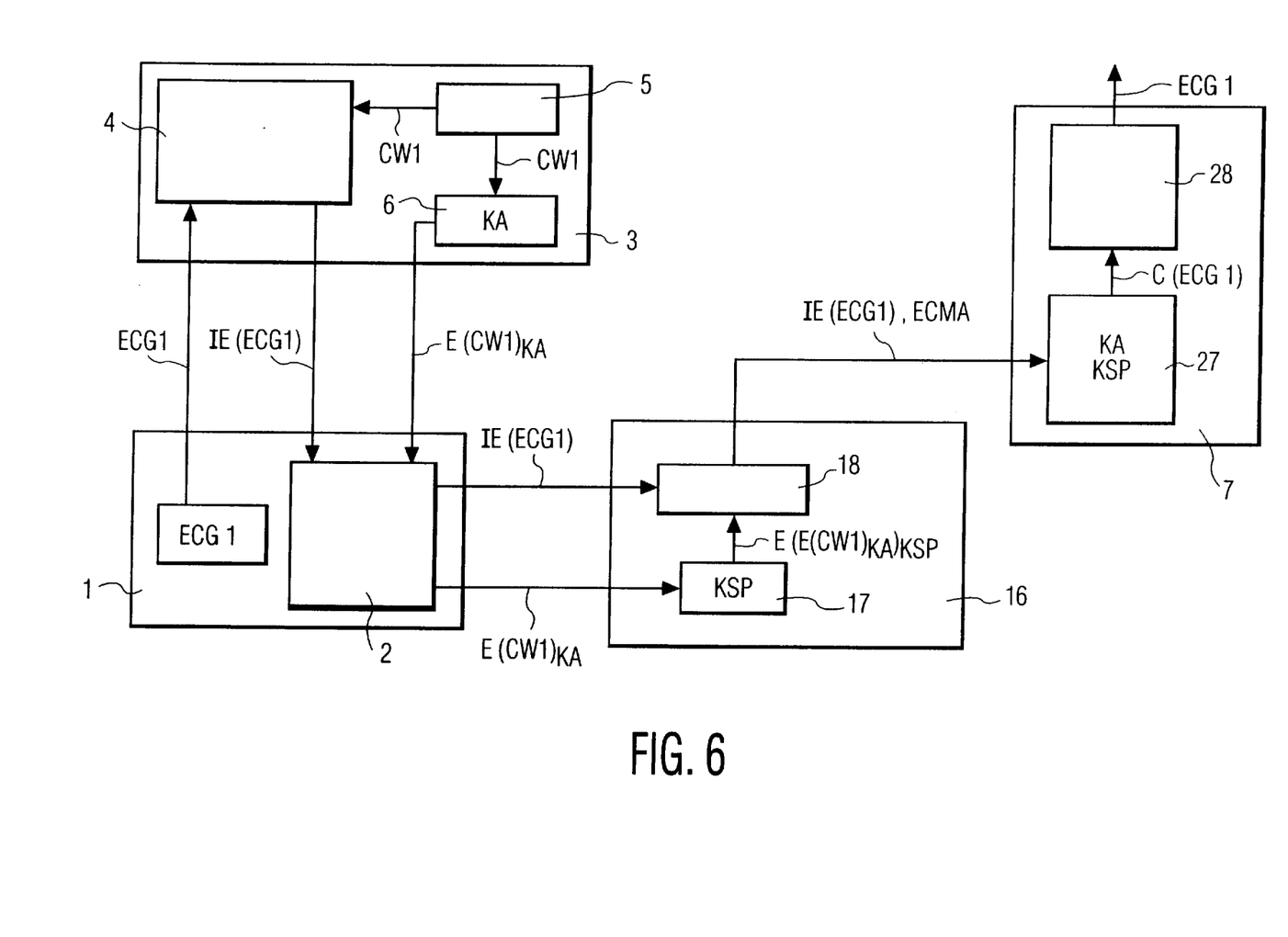
FIG. 6 represents the first application of the certification system according to the previously mentioned enhancement of the invention.

FIG. 6 represents the first application of the certification system according to the previously mentioned enhancement of the invention.

The user-card 27 receives the data stream consisting of the scrambled item IE(ECG1) and of the messages ECMA. The item arising from the user-card is a coded descrambled item C(ECG1). The decoder 28 makes it possible to decode the coded item C(ECG1) in such a way as to generate the unenciphered items ECG1.

The systems according to the invention such as those described in FIGS. 5 and 6 apply more particularly to stand-alone conditional-access systems in which the data ECG1 arise from stand-alone information media such as, for example, the media mentioned previously, or else to on-line conditional-access systems in the case in which the data ECG1 consist of recorded services and/or programmes.

Figure 7:
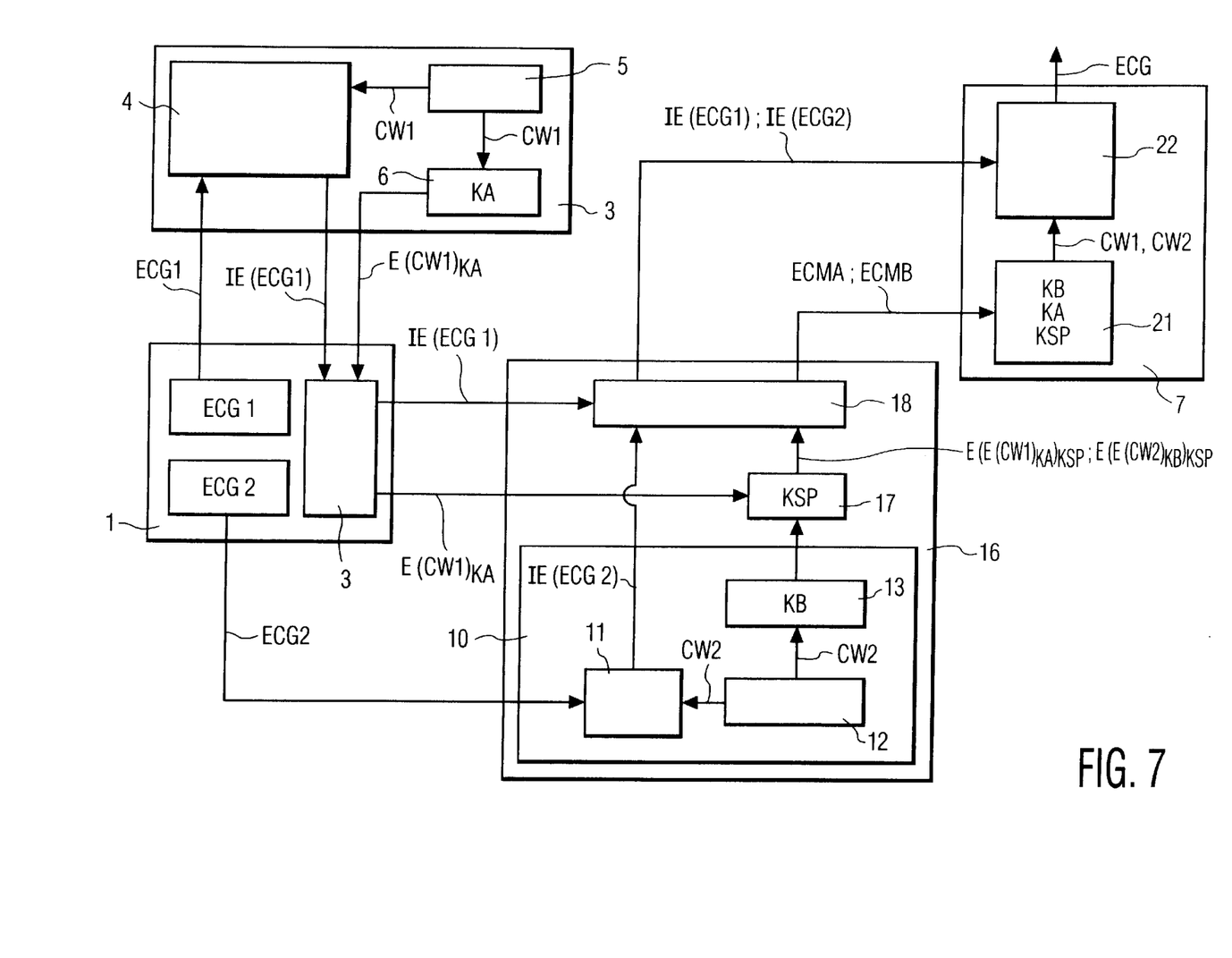
FIG. 7 represents a second application of the certification system according to the invention.
Figure 8:
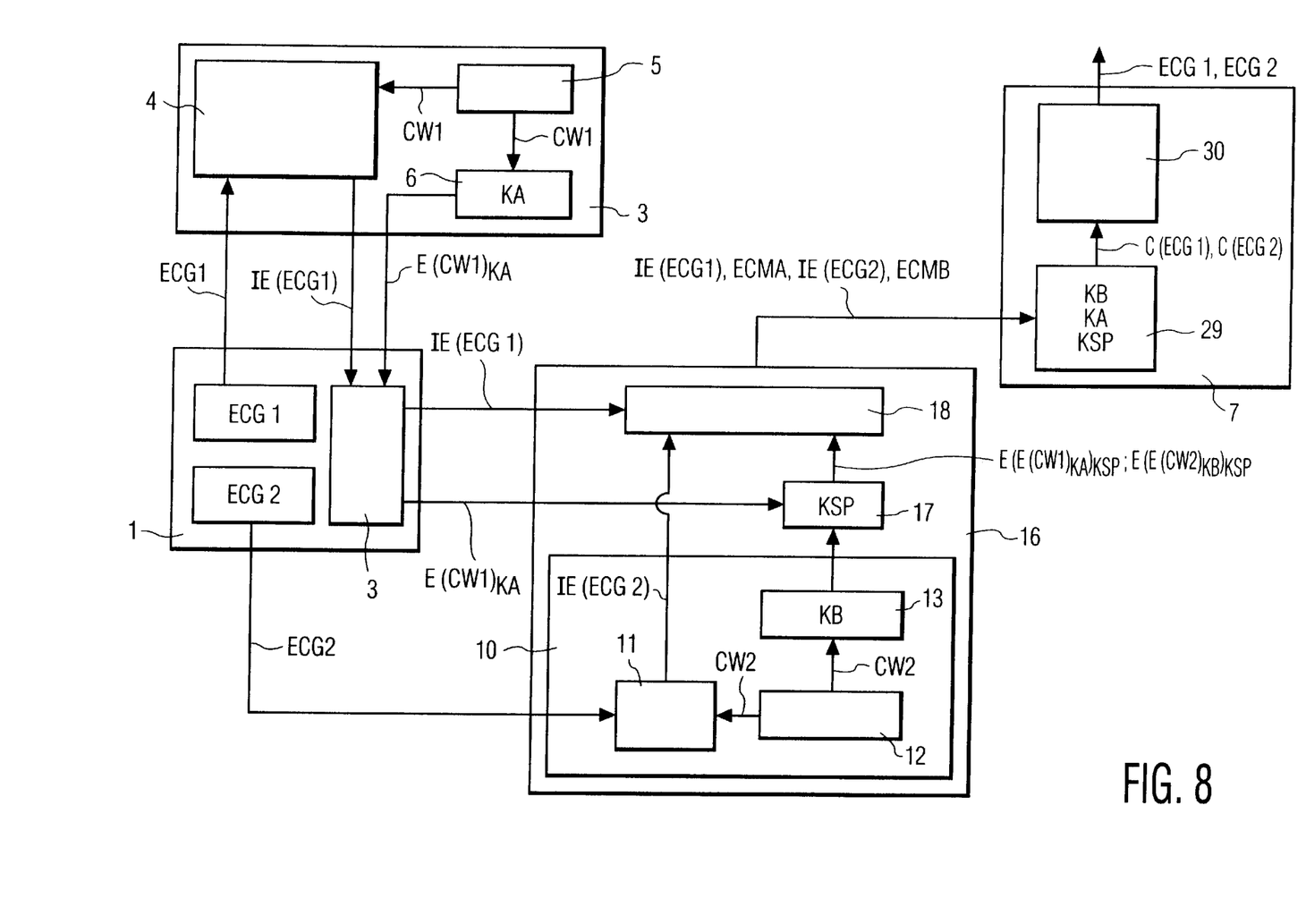
FIG. 8 represents the second application of the certification system according to the previously mentioned enhancement of the invention.

Preferably, in the case of on-line conditional-access systems which broadcast not only recorded services and/or programmes but also live broadcast services and/or programmes, the invention relates to conditional-access systems such as those represented in FIGS. 7 and 8.

In such conditional-access systems the independent authority delegates its power of authentication to the various service providers. Each service provider then comprises a certification device whose encryption key is different from the key KA.

The system described in FIG. 7 is composed of the same structures as that described in FIGS. 5 and 6: a data supplier, at least one service provider, an independent authority and at least one customer of the service provider equipped with a certification verification device 7 consisting of a user card 21 and of a decoder 22.

According to this second type of conditional-access system, the unenciphered data arising from the source 1 constitute two types of items ECG1 and ECG2.

The data ECG1 are of the same type as those mentioned previously. The broadcasting of these data applies equally well to the on-line conditional-access system as to the stand-alone conditional-access system.

The data ECG2 constitute either live broadcast services and/or programmes applying to the on-line conditional-access systems alone, or recorded programmes whose certification level need not be as high as the certification level of the data ECG1 which travel directly via the device 3.

To certify the data ECG2, new circuits are introduced at the level of each service supplier as well as in the certification verification device 7 distributed to each customer.

The scrambling and encryption device 10 is supplied to each service provider under the control of the independent authority. The key KB of the encryption circuit 12 is known only to the independent authority. According to the preferred embodiment of the invention, the key KB is common to all the service providers receiving the data from one and the same supplier. According to other embodiments, the key KB is different from one service provider to another or from one group of service providers to another.

The item $E(CW2)_{KB}$ arising from the device 10 is sent to the encryption device 17 of the service provider which then allows the generation of the item $E(E(CW2)_{KB})_{KSP}$.

The control words CW2 arising from the generator 12 are sent to the scrambling device 11 which receives, additionally, the data ECG2 consisting of the programmes and/or services transmitted live by the data supplier. The output from the scrambling device 11 then consists of the scrambled item IE(ECG2) which is then sent to the data base 18 of the service providers.

The item $E(E(CW2)_{KB})_{KSP}$ is sent via ECMs, denoted ECMB in FIG. 4, to the user card 21 which contains, apart from the encryption keys KA and KSP, the encryption key KB.

According to the conditional-access system of FIG. 4, the user card 21 uses either the keys KA and KSP to decrypt the control words carried by the ECMAs, or the keys KB and KSP to decrypt the control words carried by the ECMBs.

The ECMs sent by the service provider to its various customers contain an item making it possible to signal their nature, that is to say whether ECMA or ECMB. This item can be, for example, devised with the aid of a signalling bit carried in the ECM and a first value of which indicates whether it is an ECMA and a second value of which, complementary to the first value, whether this is an ECMB. The user card 21 then contains a circuit for processing the signalling bit so as to be able to trigger either the use of the keys KA and KSP for the decryption of the control words carried by the ECMAs, or the use of the keys KB and KSP for the decryption of the control words carried by the ECMBs.

FIG. 8 represents the second application of the certification system according to the previously mentioned enhancement of the invention.

The user-card 29 receives the set of data IE(ECG1), ECMA, IE(ECG2) and ECMB.

The items C(ECG1) and C(ECG2) arising from the card 29 are descrambled and coded items.

The decoder 30 makes it possible to retrieve the unenciphered items ECG1 and ECG2 from the items C(ECG1) and C(ECG2) which it receives.

Advantageously, conditional-access systems protected by certification such as those described in FIGS. 5, 6, 7 and 8 guarantee that only data certified by an authority independent of those who supply the unenciphered data and also of the service providers can flow within the system.

Another advantage of the invention is that it guarantees the integrity of the data which flow within the conditional-access system.

Thus, owing to the use, by the independent authority, of a certification technique based on the scrambling of the data, it is made impossible for the various service providers to modify the contents of the data for fear of preventing their customers from being able to descramble the scrambled item.

Additionally, by way of proof, the supplier of unenciphered data can always lodge, with the independent authority, a version of the data which it supplies.

According to the embodiments described above, the data supplier and the service provider constitute mutually independent separate structures. According to other embodiments, the data supplier and the service provider constitute one and the same single entity.

According to the preferred embodiment of the invention, the control words CW1 of the first string of control words are different from the control words CW2 of the second string of control words. However, the invention relates to the case in which the control words CW1 are identical to the control words CW2.

We claim:

1. A method for certifying data (ECG1) which arise from a source forming part of a first entity and are intended for at least one user, said method comprising the steps of:

scrambling said data arising from said source using a first string of control words CW1, so as to construct a first scrambled item IE(ECG1), encrypting said first string of control words CW1 using a first key KA, so as to construct a first string of encrypted control words $E(CW1)_{KA}$, wherein said scrambling and encryption steps are performed by an authority independent of the first entity and also of the user, said method further comprising the steps of:

transferring, to the user, said first scrambled item IE(ECG1) and said first string of encrypted control words $E(CW1)_{KA}$, and decrypting said first string of encrypted control words $E(CW1)_{KA}$ and descrambling said first scrambled item IE(ECG1) using means supplied to the user under the control of said independent authority.

2. The method according to claim 1, further comprising the step of storing said first scrambled item IE(ECG1) and said first string of encrypted control words $E(CW1)_{KA}$ in a data base forming part of the first entity, before said first scrambled item IE(ECG1) and said first string of encrypted control words $E(CW1)_{KA}$ are transferred to the user.

3. The method according to claim 1, further comprising the steps of:

encrypting said first string of encrypted control words $E(CW1)_{KA}$ using a third key KSP which is different from said first key KA so as to construct a third string of encrypted control words $E(E(CW1)_{KA})_{KSP}$, wherein said encryption step is performed by a second entity independent of said first entity and of said independent authority, transferring, to the user, said third string of encrypted control words $E(E(CW1)_{KA})_{KSP}$, and decrypting said third string of encrypted control words so as to generate said first string of encrypted control words $E(CW1)_{KA}$ using said means supplied to the user under the control of said independent authority.

4. The method according to claim 1, wherein the step of decrypting said first string of encrypted control words $E(CW1)_{KA}$ and of descrambling said first scrambled item IE(ECG1) prohibits access to the unenciphered control words CW1.

5. The method according to claim 1, further comprising the steps of:

scrambling data (ECG2) arising from at least one further source using a second string of control words CW2, so as to construct a second scrambled item IE(ECG2), encrypting said second string of control words using a second key KB which is different from said first key KA, so as to construct a second string of encrypted control words $E(CW2)_{KB}$, transferring, to the user, said second scrambled item IE(ECG2) and said second string of encrypted control words $E(CW2)_{KB}$, and decrypting said second string of encrypted control words $E(CW2)_{KB}$ and descrambling said second scrambled item IE(ECG2) using said means supplied to the user under the control of said independent authority, wherein said steps of scrambling data arising from at least one further source and of encrypting said second string of control words are performed under the control said independent authority.

6. The method according to claim 5, further comprising the steps of:

encrypting said second string of encrypted control words $E(CW2)_{KB}$ using a third key KSP which is different from said first and second keys, so as to construct a fourth string of encrypted control words $E(E(CW2)_{KB})_{KSP}$, wherein said encryption step is performed by a second entity independent of said first entity and of said independent authority, transferring, to the user, said fourth string of encrypted control words, decrypting said fourth string of encrypted control words so as to generate said second string of encrypted control words $E(CW2)_{KB}$ using said means supplied to the user under the control of said independent authority.

7. The method according to claim 5, wherein the step of decrypting said second string of encrypted control words $E(CW2)_{KB}$ and of descrambling said second scrambled item $IE(ECG2)$ prohibits access to the unenciphered control words CW2.

8. A system for certifying data which arise from a source and are intended for at least one user, said source forming part of a first entity, comprising:

a first scrambling and encryption device, forming part of an authority independent of the first entity and also of the user, for scrambling said data arising from said source using a first string of control words CW1 so as to construct a first scrambled item $IE(ECG1)$ and for encrypting said first string of control words using a first key KA so as to construct a first string of encrypted control words $E(CW1)_{KA}$; and a certification verification device supplied to the user under the control of the independent authority and comprising circuits for decrypting said first string of encrypted control words $E(CW1)_{KA}$ and for descrambling said first scrambled item $IE(ECG1)$ using said first string of decrypted control words CW1.

9. The certification system according to claim 8, wherein said first entity comprises a data base for storing said first scrambled item $IE(ECG1)$ and said first string of encrypted control words $E(CW1)_{KA}$, said data base being linked to the certification verification device so as to supply said certification verification device with said first scrambled item $IE(ECG1)$ as well as with said first string of encrypted control words $E(CW1)_{KA}$.

10. The certification system according to claim 8, wherein said circuits for decrypting said first string of encrypted control words and for descrambling said first scrambled item comprise:

a smart card containing said first encryption key KA for decrypting said first string of encrypted control words $E(CW1)_{KA}$ which it receives; and a decoder for descrambling said first scrambled item using said first string of decrypted control words CW1.

11. The certification system according to claim 8, wherein said circuits for decrypting said first string of encrypted control words and for descrambling said first scrambled item comprise a smart card.

12. The certification system according to claim 8, wherein said first entity comprises at least one source of further data (ECG2) and a second scrambling and encryption device delegated to said first entity under the control of said independent authority for scrambling said further data with a second string of control words CW2 so as to construct a second scrambled item $IE(ECG2)$ and for encrypting said second string of control words CW2 using a second key KB which is different from said first key KA so as to construct a second string of encrypted control words $E(CW2)_{KB}$, said second scrambled item $IE(ECG2)$ and said second string of encrypted control words $E(CW2)_{KB}$ being conveyed to the certification verification device.

13. The certification system according to claim 12, wherein said certification verification device comprises:

a smart card containing said first and second encryption keys KA and KB so as to decrypt said first string $(E(CW1)_{KA})$ or said second string $(E(CW2)_{KB})$ of encrypted control words; and a decoder for descrambling said first scrambled item $IE(ECG1)$ or said second scrambled item $IE(ECG2)$ using said first string of control words (CW1) or said second string of control words (CW2).

14. The certification system according to claim 12, wherein said certification verification device comprises a smart card containing said first and second encryption keys KA and KB so as to decrypt said first string $(E(CW1)_{KA})$ or said second string $(E(CW2)_{KB})$ of encrypted control words and for descrambling said first scrambled item $IE(ECG1)$ or said second scrambled item $IE(ECG2)$.

15. The certification system according to claim 8, further comprising a distribution circuit forming part of a second entity independent of the first entity and of the independent authority, wherein said distribution circuit receives said first scrambled item $IE(ECG1)$ and said first string of encrypted control words $E(CW1)_{KA}$ and contains:

a circuit for encrypting said first string of encrypted control words $E(CW1)_{KA}$ using a third key KSP which is different from said first key KA so as to generate a third string of encrypted control words $E(E(CW1)_{KA})_{KSP}$; and a data base for storing said first scrambled item $IE(ECG1)$ as well as said third string of encrypted control words $E(E(CW1)_{KA})_{KSP}$, said data base being linked to the certification verification device so as to supply said certification verification device with said first scrambled item $IE(ECG1)$ as well as with said third string of encrypted control words $E(E(CW1)_{KA})_{KSP}$, said certification verification device comprising means for decrypting said third string of encrypted control words $E(E(CW1)_{KA})_{KSP}$ so as to generate said first string of encrypted control words $E(CW1)_{KA}$.

16. The certification system according to claim 15, wherein said certification verification device comprises:

a smart card containing said first and third encryption keys KA and KSP so as to decrypt said third string $E(E(CW1)_{KA})_{KSP}$ and said first string $E(CW1)_{KA}$ of control words; and a decoder for descrambling said first scrambled item using said first string of decrypted control words CW1.

17. The certification system according to claim 15, wherein said certification verification device comprises a smart card containing said first and third encryption keys KA and KSP so as to decrypt said third string $E(E(CW1)_{KA})_{KSP}$ and said first string $E(CW1)_{KA}$ of control words and for descrambling said first scrambled item using said first string of decrypted control words CW1.

18. The certification system according to claim 15, wherein said first entity comprises at least one source of further data (ECG2), and wherein said second entity comprises a delegated scrambling and encryption device, supplied under control of said independent authority, for scrambling said further data with a second string of control words (CW2) so as to construct a second scrambled item $IE(ECG2)$ and for encrypting said second string of control words (CW2) using a second key KB which is different from said first key KA so as to construct a second string of encrypted control words $E(CW2)_{KB}$, said second string of encrypted control words and said second scrambled item $IE(ECG2)$ being sent to said distribution circuit which further contains:

a circuit for encrypting said second string of encrypted control words $E(CW2)_{KB}$ using said third key KSP so as to construct a fourth string of encrypted control words $E(E(CW2)_{KB})_{KSP}$, and a data base for storing said fourth string of encrypted control words $E(E(CW2)_{KB})_{KSP}$ and said second scrambled item $IE(ECG2)$, said data base being linked to the certification verification device so as to supply said certification verification device with said fourth string of encrypted control words $E(E(CW2)_{KB})_{KSP}$ as well as with said second scrambled item $IE(ECG2)$.

19. The certification system according to claim 18, wherein said certification verification device comprises:
- a smart card containing said first, second and third encryption keys KA, KB and KSP so as to decrypt said third string of encrypted control words $E(E(CW1)_{KA})_{KSP}$ or said fourth string of encrypted control words $E(E(CW2)_{KB})_{KSP}$ and said first string of encrypted control words $E(CW1)_{KA}$ or said second string of encrypted control words $E(CW2)_{KB}$; and
- a decoder for descrambling said first scrambled item IE(ECG1) using said first string of decrypted control words CW1 or said second scrambled item IE(ECG2) using said second string of encrypted control words CW2.

20. The certification system according to claim 18, wherein said certification verification device comprises a smart card containing said first, second and third encryption keys KA, KB and KSP so as to decrypt said third string of encrypted control words $E(E(CW1)_{KA})_{KSP}$ or said fourth string of encrypted control words $E(E(CW2)_{KB})_{KSP}$ and said first string of encrypted control words $E(CW1)_{KA}$ or said second string of encrypted control words $E(CW2)_{KB}$; and for descrambling said first scrambled item IE(ECG1) using said first string of decrypted control words CW1 or said second scrambled item IE(ECG2) using said second string of encrypted control words CW2.

21. The certification system according to claim 15, wherein said first entity is a data supplier, said second entity is a service provider and said user is a customer of the service provider.

22. The certification system according to claim 12, wherein said first string of control words (CW1) arises from a first generator of control words forming part of the first scrambling and encryption device and said second string of control words (CW2) arises from a second generator of control words forming part of the second delegated scrambling and encryption device.

23. The certification system according to claim 12, wherein the control words (CW1) of said first string are identical to the control words (CW2) of said second string.

24. The certification system according to claim 12, wherein the control words (CW1) of said first string are different from the control words (CW2) of said second string.

25. The certification system according to claim 18, wherein said first string of control words (CW1) arises from a first generator of control words forming part of the first scrambling and encryption device and said second string of control words (CW2) arises from a second generator of control words forming part of the second delegated scrambling and encryption device.

26. The certification system according to claim 18, wherein the control words (CW1) of said first string are identical to the control words (CW2) of said second string.

27. The certification system according to claim 18, wherein the control words (CW1) of said first string are different from the control words (CW2) of said second string.

* * * * *